United States Patent
Ogg et al.

(10) Patent No.: US 10,014,558 B2
(45) Date of Patent: *Jul. 3, 2018

(54) NICKEL IRON BATTERY EMPLOYING AN UNTREATED POLYOLEFIN SEPARATOR WITH A SURFACTANT IN THE ELECTROLYTE

(71) Applicant: Encell Technology, Inc., Alachua, FL (US)

(72) Inventors: Randy Gene Ogg, Newberry, FL (US); Alan P. Seidel, High Springs, FL (US)

(73) Assignee: ENCELL TECHNOLOGY, INC., Alachua, FL (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/256,024

(22) Filed: Sep. 2, 2016

(65) Prior Publication Data

US 2016/0372794 A1     Dec. 22, 2016

Related U.S. Application Data

(63) Continuation of application No. 14/174,131, filed on Feb. 6, 2014.

(60) Provisional application No. 61/761,312, filed on Feb. 6, 2013, provisional application No. 61/907,958, filed on Nov. 22, 2013.

(51) Int. Cl.
*H01M 10/26* (2006.01)
*H01M 10/30* (2006.01)
*H01M 2/16* (2006.01)

(52) U.S. Cl.
CPC ........ *H01M 10/26* (2013.01); *H01M 2/1653* (2013.01); *H01M 10/30* (2013.01); *H01M 2300/0014* (2013.01); *Y02E 60/124* (2013.01); *Y02P 70/54* (2015.11)

(58) Field of Classification Search
CPC ............................ H01M 10/26; H01M 10/30
See application file for complete search history.

(56) References Cited

U.S. PATENT DOCUMENTS

| | | | |
|---|---|---|---|
| 3,898,098 A | | 8/1975 | Giles |
| 4,250,236 A | * | 2/1981 | Haschka ............... H01M 4/248 429/207 |
| 6,051,333 A | | 4/2000 | Nagai et al. |
| 6,132,901 A | * | 10/2000 | Clough ................. H01M 4/62 429/215 |
| 6,558,848 B1 | | 5/2003 | Kobayashi et al. |
| 6,844,111 B2 | | 1/2005 | Mirzoev et al. |
| 2003/0193110 A1 | | 10/2003 | Yaritz et al. |

(Continued)

OTHER PUBLICATIONS

WO1994020995.*

(Continued)

*Primary Examiner* — Ula C Ruddock
*Assistant Examiner* — Gregory A Passa
(74) *Attorney, Agent, or Firm* — E. Joseph Gess; Melissa M. Hayworth

(57) ABSTRACT

Provided is a nickel-iron battery. The battery comprises a positive nickel electrode, an iron negative electrode, an electrolyte comprising a surfactant, and a non-polar separator. In one embodiment, the non-polar separator is comprised of a polyolefin, and the surfactant comprises an anionic surfactant, a cationic surfactant or a zwitterionic surfactant.

8 Claims, 2 Drawing Sheets

(56) References Cited

U.S. PATENT DOCUMENTS

| | | |
|---|---|---|
| 2006/0167172 A1* | 7/2006 | Yang .................. B01F 17/0028 524/558 |
| 2010/0112421 A1 | 5/2010 | Davis et al. |
| 2011/0123850 A1 | 5/2011 | Duong et al. |
| 2011/0151317 A1* | 6/2011 | Giroud .................. H01B 1/122 429/162 |
| 2012/0172618 A1* | 7/2012 | Munzenberg .......... C08G 71/04 560/160 |
| 2012/0187918 A1 | 7/2012 | Narayan et al. |
| 2013/0017451 A1* | 1/2013 | Kida ....................... D01D 5/30 429/249 |
| 2013/0115532 A1 | 5/2013 | Friesen et al. |

OTHER PUBLICATIONS

Vittal, R., H. Gomathi, and Kang-Jin Kim. "Beneficial Role of Surfactants in Electrochemistry and in the Modification of Electrodes." Advances in Colloid and Interface Science 119.1 (2006): 55-68. Web.*
International Search Report from corresponding Application No. PCT/US2014/015082 dated May 22, 2014.
International Search Report from corresponding Application No. PCT/US2014/015049 dated May 27, 2014.
WO 2010/004012.
WO 2011/032664.
WO 2011/122657.

* cited by examiner

NICKEL IRON BATTERY EMPLOYING AN UNTREATED POLYOLEFIN SEPARATOR WITH A SURFACTANT IN THE ELECTROLYTE

CROSS REFERENCE TO RELATED APPLICATIONS

This application claims priority as a continuation application to U.S. application Ser. No. 14/174,131, filed Feb. 6, 2014, which in turn claims priority to U.S. Application No. 61/907,958, filed Nov. 22, 2013; and U.S. Application No. 61/761,312, filed Feb. 6, 2013, which applications are incorporated herein by reference in their entireties.

BACKGROUND OF THE INVENTION

Field of the Invention

The present invention is in the technical field of energy storage devices. More particularly, the present invention is in the technical field of rechargeable batteries employing an iron electrode, and the separators used in those batteries.

State of the Art

The nickel iron (Ni—Fe) battery was independently developed by Edison in the United States and by Junger in Sweden in 1901. It was industrially important from its introduction until the 1970's when batteries with superior specific energy and energy density replaced Ni—Fe batteries in many applications.

However, Ni—Fe batteries have many advantages over other battery chemistries. The Ni—Fe battery is a very robust battery which is very tolerant of abuse such as overcharge and overdischarge and can have a very long life. It is often used in backup situations where it can be continuously trickle-charged and last more than 20 years. Additionally, the active material iron is much less expensive than active materials used in other alkaline battery systems such as NiMH or in non-aqueous batteries such as Li Ion. However, the low specific energy, low energy density, and poor power have limited the applications of this battery system.

The Ni—Fe battery is a rechargeable battery having a nickel(III) oxy-hydroxide positive electrode and an iron negative electrode, with an alkaline electrolyte such as potassium hydroxide. The overall cell reaction can be written as:

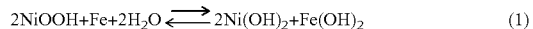

$$2NiOOH+Fe+2H_2O \rightleftarrows 2Ni(OH)_2+Fe(OH)_2 \qquad (1)$$

The ability of these batteries to survive frequent cycling is due to the low solubility of the reactants in the electrolyte. The formation of metallic iron during charge is slow due to the low solubility of the reaction product ferrous hydroxide. While the slow formation of iron crystals preserves the electrodes, it also limits the high rate performance. Ni—Fe cells are typically charged galvanostatically and should not be charged from a constant voltage supply since they can be damaged by thermal runaway. Thermal runaway occurs due to a drop in cell voltage as gassing begins due to overcharge, raising the cell temperature, increasing current draw from a constant potential source, further increasing the gassing rate and temperature.

As shown in Equation (1), the overall cell reaction does not involve the battery electrolyte; however, alkaline conditions are required for the individual electrode reactions. Therefore, iron-based batteries such as Ni—Fe, Fe-air, and Fe—MnO$_2$ batteries all employ a strong alkaline electrolyte typically of KOH, typically in the range of 30-32% KOH. KOH is typically employed due to its higher conductivity and low freezing point. LiOH may be added in cells subject to high temperatures due to its stabilization effects on the nickel electrode, improving its charge acceptance at elevated temperatures.

The separators used in the cell construction depends upon the types of electrodes used. In Ni—Fe cells with a pocket plate electrodes, the anode and cathode are kept electrically isolated using a spacer or a grid-like mesh inlay and are typically held in a rigid frame. However, the construction of these cells is more expensive as the electrode design is not amenable to lower-cost manufacturing methods. Furthermore, the large inter-electrode spacing of these batteries imposed by the rigid support limits high rate performance.

Cells constructed with plastic-bonded, sintered, fiber, or foam electrodes are often lower in cost than cells with pocket plate electrodes. The electrode manufacturing process is cheaper, easier, and provides greater consistency between electrodes than the pocket plate design. Unlike Ni—Fe cells with a pocket plate electrodes, these cells use microporous separators. These cells have other advantages besides lower cost such as higher rate capability and greater energy density since microporous separators are much thinner which keeps the inter-electrode spacing small as the electrodes are held in place through compression. Microporous separators that consist of polypropylene, polyethylene, and polyolefin blends have been used in alkaline battery systems. The non-polar nature of the polyolefin chain makes it difficult to wet the separator. This problem has been addressed by modifying the surface properties of the polyolefin materials used to form polymeric sheets, by graft-copolymerizing to those surfaces a monomeric substance which, after copolymerization, confers hydrophilic properties and, in some cases, ion exchange properties.

However, it has been observed that a failure mechanism for Ni—Fe cells appears to be iron or iron oxide accumulation on the separator. The accumulation can lead to an electrical short between the anode and cathode. Such an accumulation of iron or iron oxide leads to a premature failure of the cell.

An object of this invention is to improve the cell life of a battery comprising an iron electrode. Another object is to provide a separator/electrolyte combination that overcomes the problems of premature failure of a Ni—Fe cell. Providing such a solution would be of great value to the industry.

SUMMARY OF THE INVENTION

Provided is a nickel-iron battery comprising a nickel positive electrode, an iron negative electrode, an electrolyte comprising a surfactant, and a non-polar separator. By utilizing a separator is that comprised of a non-polar material on its surface along with a surfactant, the cell life of a Ni—Fe cell is increased. The wettability of the nonpolar separator by an alkaline electrolyte is also improved by using an electrolyte comprising a surfactant.

Among other factors, it has been found that by using an alkaline electrolyte comprising a surfactant in a Ni—Fe cell when a non-polar separator is used, the combination of the electrolyte with the surfactant and non-polar separator results in an increased cell life. Generally, the non-polar separator can be treated for wettability. However, the non-polar separator can be totally untreated in the present invention yet achieve a Ni—Fe cell with increased cell life.

DETAILED DESCRIPTION OF THE INVENTION

The invention comprises a Ni—Fe cell with a separator that is non-polar, such as a polyolefin, and an alkaline electrolyte that comprises a surfactant. During testing of different separators and electrolyte solutions it was unexpectedly observed that separators with no surface treatment in combination with an electrolyte containing a surfactant had improved life compared to cells with a separator whose surface was treated for improved wettability and cells that had a polyolefin separator whose surface was not treated to improve wettability but had no surfactant. The battery may be prepared by conventional processing and construction employing a nickel oxyhydroxide positive electrode, an alkaline electrolyte, and iron electrode. The nickel electrode may be of a sintered type well known in the art or may be of a pasted type employing a foam or felt matrix. The battery electrolyte may comprise a KOH solution, or alternatively is a NaOH based electrolyte, and also comprises a surfactant. The separator is a polyolefin that has not been treated to increase wettability. The iron electrode may be of a pasted design comprising a single layer of substrate coated with a binder and an iron active material comprising iron metal or iron oxides.

Microporous separators that are comprised of polypropylene, polyethylene, and polyolefin blends are commonly used in alkaline battery systems. The non-polar nature of the polyolefin chain makes it difficult to wet the separator. The wettability is increased by graft-copolymerizing to those surfaces a monomeric substance which, after copolymerization, confers hydrophilic properties. The grafted species often contains a carboxylic acid group, carboxylate, or sulfonate that when placed in an alkaline electrolyte environment is mostly the cation of the electrolyte charge carrier as its cation. Thus, in a NaOH based alkaline electrolyte, the counter-ion for a carboxylate or sulfonate group on the separator after immersion in the electrolyte would primarily be $Na^+$. However, by modifying the surfaces in such a manner, the surface of the separator may take on the ability to allow ion-exchange which could allow iron ions to accumulate at the separator.

Figure 1:
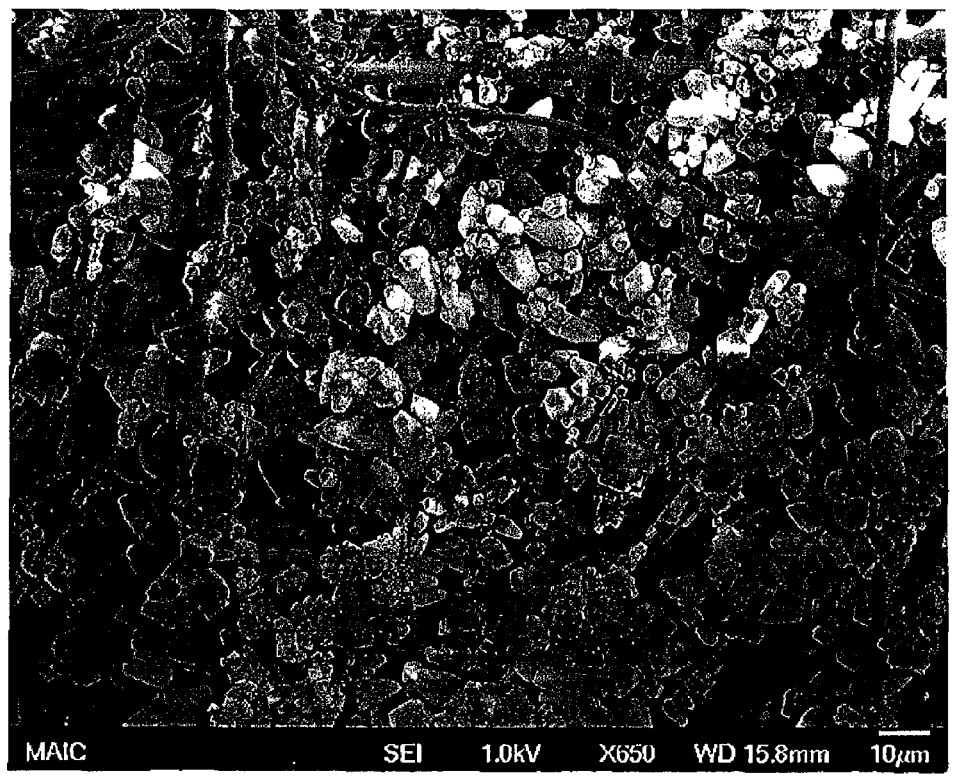
FIG. 1 is an image of magnetite deposits that were found coating the fibers of the separator of a Ni—Fe cell with polyolefin separators consisting of polypropylene whose surface was treated to improve its wettability.

Ni—Fe cells that had reached their end-of-life were autopsied opened and the components were inspected. Magnetite, $Fe_3O_4$ deposits were found coating the fibers of the separator of a Ni—Fe cell with polyolefin separators consisting of polypropylene whose surface was treated to improve its wettability. Magnetite may have been the original deposit or may have originated from iron deposits that oxidized upon exposure to air prior to analysis, see FIG. 1. During autopsy it was also observed that the separator was adhered to the electrodes. Furthermore, it was found that Ni—Fe cells could be rejuvenated by draining the electrolyte, replacing the separator, and then refilling the cell with the drained electrolyte. This suggests that the deposition of iron or iron compounds on the separator is responsible for cell failure. It is believed that functionalization of the separator by grafting hydrophilic groups to increase its wettability also allows for ion-exchange where iron ions could collect and lead to eventual iron accumulation.

While not wishing to be bound by any theory, it is believed that during discharge, iron is oxidized forming iron cations that have a slight solubility in the alkaline electrolyte. These iron cations may undergo ion-exchange with the cations associated with functional groups on a separator whose surface has been modified to improve wettability. The deposited iron cations may be either unstable in the alkaline electrolyte and form magnetite or might be reduced to iron metal by hydrogen gas that is generated during charging of the cell causing a build-up of iron on the separator. Cells with a separator having no surface treatment would suffer from wetting issues.

In the present invention, the non-wettability of untreated polyolefins has been overcome by treating the polyolefin material with a surfactant. The surfactant is contained in the alkaline electrolyte, which allows an aqueous electrolyte to wet the separator. However, such surfactant can be removed or lost from the surface of the polyolefin separator material when electrolyte is lost from the device. For example, this can happen during charging and discharging cycles, if the surfactant is not subsequently replaced on the material when the electrolyte is replenished.

The nickel-iron battery of the present invention comprises an untreated non-polar, e.g., polyolefin separator and an electrolyte that contains a surfactant. Suitable polyolefins include, but are not limited to: polyethylene (including, for example, LDPE, LLDPE, HDPE, UHDPE), polypropylene, polybutylene, polymethylpentane, co-polymers thereof, and blends thereof. The separators may comprise layered sheets of materials. The separator has a nonpolar surface and is not chemically treated to improve wettability to aqueous electrolytes.

The alkaline electrolyte of the battery comprises a surfactant to improve the wettability of the untreated polyolefin separator. Low foaming surfactants are preferred. The surfactant may be an anionic surfactant possessing anionic functional end groups, such as a sulfate, sulfonate, phosphate, and carboxylates. Cationic surfactants may also be used where a tertiary amine is an end group. Zwitterionic surfactants such as sultaines having both cationic and anionic centers attached to the same molecule may also be used. In a preferred embodiment, Rhodia Mirataine® ASC Surfactant consisting of an alkylether hydroxypropyl sultaine is used.

The following examples are provided to further illustrate the present invention. The examples are meant to be illustrative, and not limiting.

EXAMPLES

Example 1

Figure 2:
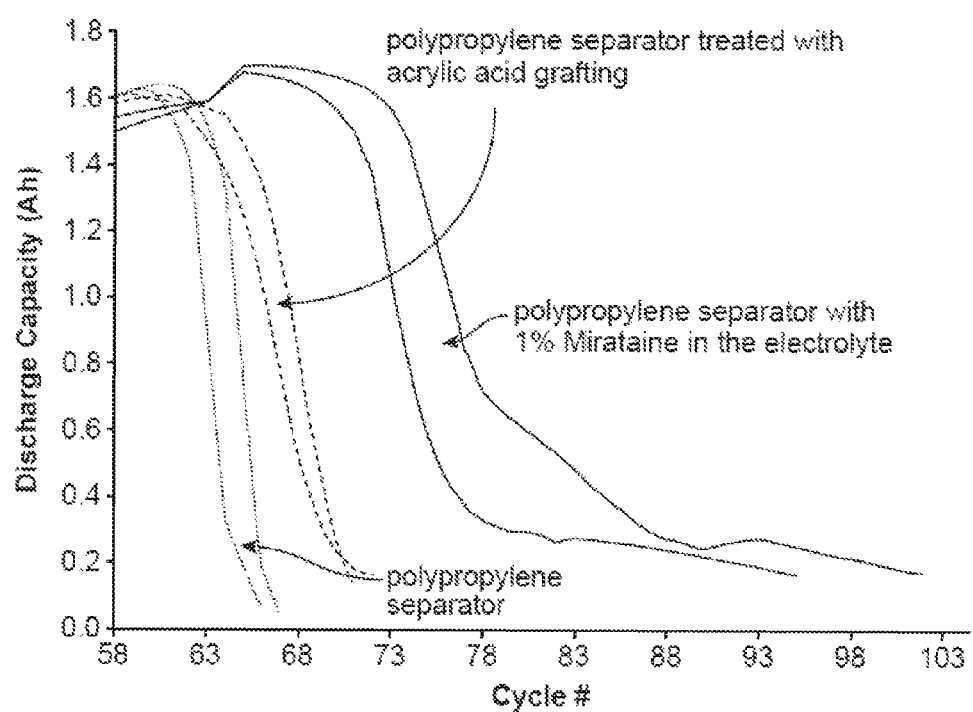
FIG. 2 shows the capacity versus cycle number during an accelerated life test for nickel-iron cells that have a polypropylene separator treated with acrylic acid grafting to improve wetting (solid line), an untreated polypropylene separator (dashed line), and an untreated polypropylene separator in a cell with an electrolyte containing 1% mirataine.

The positive electrodes of nickel iron batteries were constructed from sintered nickel electrodes impregnated with nickel hydroxide. The negative electrode in the batteries was a pasted design comprising a single layer of substrate coated with a binder and an iron active material comprising iron metal. The electrolyte used comprised 30% KOH with 1 N LiOH. The separator was 4.5 mil thick microporous polypropylene treated with acrylic acid grafting, which results in oligomeric acrylic acid on the polymer chain. After initial formation and performance testing, cells were put on an accelerated life test. Two cells were tested. The results are shown in FIG. 2.

Example 2

The positive electrodes of nickel iron batteries were constructed from sintered nickel electrodes impregnated with nickel hydroxide. The negative electrode in the batteries was a pasted design comprising a single layer of substrate coated with a binder and an iron active material comprising iron metal. The electrolyte used comprised 30% KOH with 1 N LiOH. The separator was 4.5 mil thick microporous polypropylene that was not treated to improve wetting. After initial formation and performance testing, cells were put on an accelerated life test. Two cells were tested. The results are shown in FIG. 2.

Example 3

The positive electrodes of nickel iron batteries were constructed from sintered nickel electrodes impregnated with nickel hydroxide. The negative electrode in the batteries was a pasted design comprising a single layer of substrate coated with a binder and an iron active material comprising iron metal. The electrolyte used comprised 30% KOH with 1 N LiOH with 1% Rhodia MIRATAINE® ASC Surfactant. The separator was 4.5 mil thick microporous polypropylene that was not treated to improve wetting. After initial formation and performance testing, cells were put on an accelerated life test. Two cells were tested. The results are shown in FIG. 2.

From the results shown in FIG. 2, it can be seen that the nickel-iron cell of Example 3, using an untreated polypropylene separator and an electrolyte with a surfactant, provided increased cell life.

While the foregoing written description of the invention enables on of ordinary skill to make and use what is considered presently to be the best mode thereof, those of ordinary sill will understand and appreciate the existence of various, combination, and equivalents of the specific embodiment, method and examples therein. The invention should therefore not be limited by the above described embodiment, method and examples, but by all embodiments and methods within the scope and spirit of the inventions and the claims appended therein.

What is claimed is:

1. A nickel-iron battery comprising a nickel positive electrode, an iron negative electrode, an alkaline electrolyte comprising a low-foaming, zwitterionic surfactant, and a non-polar separator which has not been subjected to chemical grafting.

2. The nickel-iron battery of claim 1, wherein the separator is comprised of a polyolefin.

3. The nickel-iron battery of claim 2, wherein the separator is comprised of polypropylene or polyethylene.

4. The nickel-iron battery of claim 1, wherein the electrolyte comprises NaOH.

5. The nickel-iron battery of claim 1, wherein the surfactant comprises a sultaine.

6. The nickel-iron battery of claim 1, wherein the iron electrode comprises a single layer substrate coated with an iron active material.

7. The nickel-iron battery of claim 6, wherein the coating on the substrate of the iron electrode further comprises a binder.

8. The nickel-iron battery of claim 6, wherein the iron active material of the iron electrode comprises iron metal or an iron oxide.

* * * * *